(12) United States Patent
Teshome et al.

(10) Patent No.: US 12,432,219 B2
(45) Date of Patent: Sep. 30, 2025

(54) MANAGING DATA PROCESSING SYSTEMS BASED ON LOCATION USING OUT-OF-BAND COMMUNICATIONS

(71) Applicant: Dell Products L.P., Round Rock, TX (US)

(72) Inventors: Abeye Teshome, Austin, TX (US); Mohit Arora, Frisco, TX (US); Bassem El-Azzami, Austin, TX (US); Luis Antonio Valencia Reyes, Waxahachie, TX (US); Adolfo Sandor Montero, Pflugerville, TX (US); Richard M. Tonry, Georgetown, TX (US); Vinodkumar Vasudev Ottar, Mckinney, TX (US); Rajaravi Chandra Kollarapu, Allen, TX (US)

(73) Assignee: Dell Products L.P., Round Rock, TX (US)

(*) Notice: Subject to any disclaimer, the term of this patent is extended or adjusted under 35 U.S.C. 154(b) by 119 days.

(21) Appl. No.: 18/498,332

(22) Filed: Oct. 31, 2023

(65) Prior Publication Data

US 2025/0141880 A1 May 1, 2025

(51) Int. Cl.
*H04L 9/40* (2022.01)
(52) U.S. Cl.
CPC .................. *H04L 63/107* (2013.01)
(58) Field of Classification Search
CPC .................................................. H04L 63/107
See application file for complete search history.

(56) References Cited

U.S. PATENT DOCUMENTS

| | | |
|---|---|---|
| 7,599,907 B2 | 10/2009 | Havewala et al. |
| 8,020,192 B2 | 9/2011 | Wright et al. |
| 8,490,163 B1 | 7/2013 | Harsell et al. |
| 8,850,186 B2 | 9/2014 | Yamauchi |
| 9,191,781 B2 | 11/2015 | Kumar |
| 9,246,678 B2 | 1/2016 | Nayshtut et al. |
| 9,349,009 B2 | 5/2016 | Rivera |

(Continued)

OTHER PUBLICATIONS

Qayyum et al., "Awareness of Kill Switch Application Among Mobile Phone Users" 2019 UK/ China Emerging Technologies (UCET), Glasgow, UK, 2019, pp. 1-5, doi: 10.1109/UCET.2019.8881876 ( 5 pages).

(Continued)

*Primary Examiner* — Philip J Chea
(74) *Attorney, Agent, or Firm* — WOMBLE BOND DICKINSON (US) LLP

(57) ABSTRACT

Methods and systems for managing a data processing system based on location data are disclosed. A management controller of the data processing system may provide the location data via an out-of-band communication channel to a geolocation management server tasked with mapping a location of the data processing system over time. The data processing system may identify an occurrence of an event based on the location data (e.g., a change in location of the data processing system), prompting the data processing system to perform an action set to update operation of the data processing system (e.g., to conform to location-based policies). Based on its updated operation, the data processing system may provide computer-implemented services that are more likely to be in compliance with local policies.

20 Claims, 8 Drawing Sheets

(56) References Cited

U.S. PATENT DOCUMENTS

| | | |
|---|---|---|
| 9,392,021 B1 | 7/2016 | Labana |
| 9,721,111 B2 | 8/2017 | Cavanaugh |
| 9,721,175 B2 | 8/2017 | Kursun et al. |
| 9,785,491 B2 | 10/2017 | Cilfone et al. |
| 10,021,669 B2 | 7/2018 | George |
| 10,163,105 B1 | 12/2018 | Ziraknejad et al. |
| 10,169,571 B1 | 1/2019 | Attfield et al. |
| 10,225,158 B1 | 3/2019 | Lu |
| 10,395,039 B2 | 8/2019 | Khatri et al. |
| 10,630,489 B2 | 4/2020 | Hughes |
| 10,678,555 B2 | 6/2020 | Johansson et al. |
| 10,841,295 B1 | 11/2020 | Pecen et al. |
| 10,887,276 B1 * | 1/2021 | Parulkar ................ H04L 43/10 |
| 11,563,565 B2 | 1/2023 | Yang et al. |
| 11,704,384 B2 | 7/2023 | Murphy et al. |
| 2007/0113266 A1 | 5/2007 | Ross |
| 2010/0019730 A1 | 1/2010 | Chueh |
| 2010/0191837 A1 | 7/2010 | Linden |
| 2012/0032834 A1 | 2/2012 | Weeks |
| 2012/0046025 A1 | 2/2012 | Das |
| 2012/0151223 A1 | 6/2012 | Conde Marques |
| 2012/0166605 A1 | 6/2012 | Chou |
| 2012/0202447 A1 | 8/2012 | Edge |
| 2013/0086262 A1 * | 4/2013 | Bhadri ................ H04L 67/025 709/224 |
| 2013/0210464 A1 | 8/2013 | Mittal |
| 2014/0082754 A1 | 3/2014 | Guo |
| 2014/0181891 A1 | 6/2014 | Von Bokern |
| 2015/0121506 A1 | 4/2015 | Cavanaugh |
| 2016/0378169 A1 | 12/2016 | Naeimi |
| 2017/0277876 A1 | 9/2017 | Alameh et al. |
| 2017/0289197 A1 | 10/2017 | Mandyam et al. |
| 2017/0364712 A1 | 12/2017 | Munafo |
| 2018/0006829 A1 | 1/2018 | Kravitz et al. |
| 2018/0191733 A1 * | 7/2018 | Kundu ................ H04L 63/0428 |
| 2018/0253569 A1 | 9/2018 | Swierk |
| 2019/0095352 A1 | 3/2019 | Poornachandran |
| 2019/0156019 A1 | 5/2019 | Chen |
| 2019/0173962 A1 * | 6/2019 | Ben Ali ................ H04L 67/141 |
| 2020/0092332 A1 | 3/2020 | Bhattathiri |
| 2020/0137688 A1 | 4/2020 | Gulbay |
| 2021/0168093 A1 | 6/2021 | Andrews |
| 2022/0222328 A1 | 7/2022 | Talib et al. |
| 2023/0124661 A1 | 4/2023 | Liu |
| 2023/0297701 A1 | 9/2023 | Mouallem |
| 2023/0403555 A1 | 12/2023 | Farooq |
| 2024/0421916 A1 | 12/2024 | Myron |

OTHER PUBLICATIONS

Tu et al., "Understanding User's Behaviors in Coping with Security Threat of Mobile Devices Loss and Theft", 2012 45th Hawaii International Conference on System Sciences, Maui, HI, USA, 2012, pp. 1393-1402, doi: 10.1109/HICSS.2012.620 (10 pages).

Pfitzmann et al., "Trusting Mobile User Devices and Security Modules", in Computer, vol. 30, No. 2, pp. 61-68, Feb. 1997, doi: 10.1109/2.566159 (8 pages).

Ju et al., "Implementation of a Hardware Security Chip for Mobile Devices", in IEEE Transaction on Consumer Electronics, vol. 61, No. 4, pp. 500-506, Nov. 2015, doi: 10.1109/TCE.2015.7389805 (7 pages).

* cited by examiner

MANAGING DATA PROCESSING SYSTEMS BASED ON LOCATION USING OUT-OF-BAND COMMUNICATIONS

FIELD

Embodiments disclosed herein relate generally to managing data processing systems. More particularly, embodiments disclosed herein relate to systems and methods for managing data processing systems based on location data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
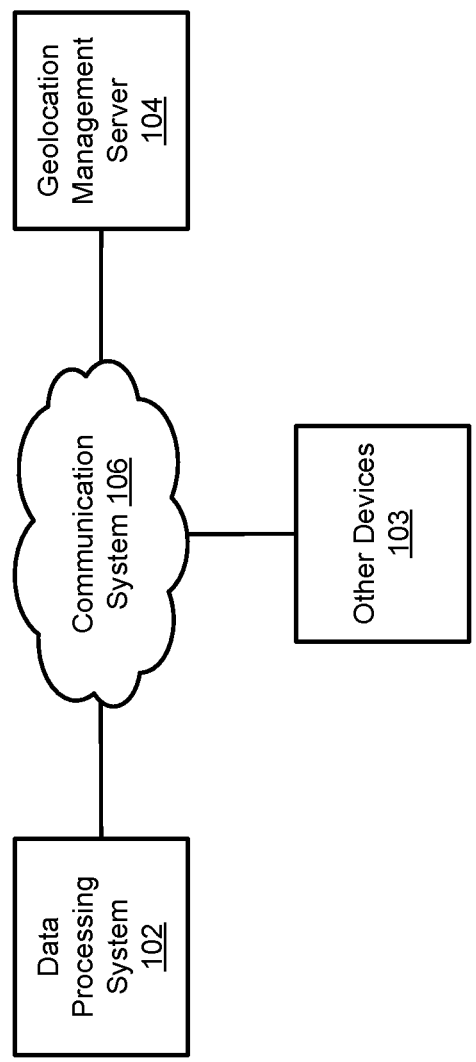
FIG. 1A shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a data processing system based on location data. For example, the data processing system may provide computer-implemented services that may vary depending on the physical location (e.g., geographical location) of the data processing system. The computer-implemented services may, for example, be subject to policies associated with a geographical region (e.g., government laws and regulations associated with the geographical region, rules set forth by an administrator of the data processing system relevant to the geographical region, etc.). The policies may, for example, prohibit certain types of computer-implemented services (e.g., computer-implemented services that include the use of sensitive data) while the data processing system is physically present in the geographical region. Therefore, the operation of the data processing system (e.g., and the resulting computer-implemented services) may be managed based on location data (e.g., data usable to determine the physical location of the data processing system).

To do so, a data processing system may include hardware resources (e.g., in-band components of the data processing system) that may transmit location data over a communication network such as a Wi-Fi network. The location data may be used to determine a location of the data processing system and operation of the data processing system may be updated (e.g., restricted) to reflect policies associated with the location in order to provide computer-implemented services that are compliant with the policies (e.g., rules, laws, regulations, etc.).

However, the data processing system may, for various reasons, become unable to provide reliable location data. For example, the hardware resources of the data processing system may become unpowered, may be unable to connect to a communication network, and/or may become compromised by a malicious party (e.g., that may tamper with the location data). If reliable location data for the data processing system is unavailable, then the security of sensitive data stored by (or accessible by) the data processing system may be jeopardized and/or the data processing system may provide computer-implemented services that violate applicable policies (e.g., which may incur penalties).

Thus, to increase the likelihood of the data processing system providing reliable location data, the data processing system may include out-of-band components usable for providing location data for the data processing system. The location data may be provided (e.g., to other devices that may participate in the management of the operation of the data processing system) by the out-of-band components via out-of-band network communications, thereby bypassing potentially compromised (or unpowered) in-band components and in-band communication channels of the data processing system.

By doing so, embodiments disclosed herein may provide a system for managing a data processing system based on location data that may be provided using out-of-band components and out-of-band communication channels. To do so, the data processing system may include out-of-band components such as a management controller. The management controller may, for example, provide the location data via out-of-band communication channels to a geolocation management server that may manage the location data and/or map locations of the data processing system over time. The out-of-band communication channels may use a communication network different from the communication network used by in-band communication channels thereby allowing the management controller to provide location data to the geolocation management server without traversing in-band communication channels of the data processing system.

By circumventing potentially compromised or inoperable in-band communication channels and in-band components of the data processing system, the location data may be securely and reliably provided to the geolocation management server. Thus, the location data managed by the geolocation management server may be trusted for use in updating operation of the hardware resources of the data processing system. The updated operation may be more likely to provide secure and policy compliant computer-implemented services.

In an embodiment, a computer-implemented method for managing a data processing system based on location data is provided. The method may include: providing, by a management controller of the data processing system and via an out-of-band communication channel, the location data to a geolocation management server tasked with mapping a location of the data processing system over time; identifying, by the data processing system, an occurrence of an event that is based, at least in part, on the location data; performing, by the data processing system, an action set based on the occurrence of the event to update operation of the data processing system; and, providing, by the data processing system, computer-implemented services based on the updated operation.

In an instance of the event where the event is reception of the action set from the geolocation management server, performing the action set may include limiting, by the management controller, use of at least one function of the data processing system.

Limiting the use of the at least one function may include disabling, by the management controller, a portion of hardware resources of the data processing system. Limiting the use of the at least one function may further include disabling, by the management controller, a piece of software hosted by the hardware resources of the data processing system.

In an instance of the event where the event is initiating, by hardware resources of the data processing system, a provisioning process, the method may include sending, by the hardware resources, a provisioning request to a first provisioning server.

In the instance of the event where the event is initiating, by the hardware resources, the provisioning process, the method may also include obtaining, by the hardware resources and from the first provisioning server, a provisioning response that is responsive to the provisioning request and based on the location data.

In the instance of the event where the event is initiating, by the hardware resources, the provisioning process, the method may also include obtaining, by the hardware resources and from a second provisioning server, a provisioning response that is responsive to the provisioning request and based on the location data.

The data processing system may include a network module adapted to separately advertise network endpoints for the management controller and hardware resources of the data processing system, the network endpoints being usable by the geolocation management server to address communications to the hardware resources and the management controller.

The management controller and the network module may be on separate power domains from the hardware resources so that the management controller and the network module may be operable while the hardware resources are inoperable.

The location data may be generated by the network module while the hardware resources are inoperable due to being unpowered.

The out-of-band communication channel may run through the network module, and an in-band communication channel that services the hardware resources may also run through the network module.

The management controller may host a transmission control protocol/internet protocol (TCP/IP) stack to facilitate network communications via the out-of-band communication channel.

A non-transitory media may include instructions that when executed by a processor cause the computer-implemented method to be performed.

The data processing system may include the non-transitory media and a processor, and may perform the computer-implemented method when the computer instructions are executed by the processor.

Turning to FIG. 1A, a block diagram illustrating a distributed system in accordance with an embodiment is shown. The (distributed) system shown in FIG. 1A may provide computer-implemented services. The computer-implemented services may include any type and quantity of services including, for example data services (e.g., data storage, access and/or control services), communication services (e.g., instant messaging services, video-conferencing services), and/or any other type of service that may be implemented with a computing device.

The computer-implemented services may be provided by one or more components of the system of FIG. 1A. For example, data processing system 102 may include portable devices that may provide computer-implemented services. The computer-implemented services may be subject to policies, rules, and/or regulations that may be defined by government entities, administrators (e.g., of data processing system 102), etc., and/or that may be based on geographical location. For example, depending on the location of data processing system 102, the computer-implemented services provided by data processing system 102 may violate export control laws and/or may be prohibited due to security issues.

Thus, the computer-implemented services provided by a data processing system (e.g., of data processing system 102) may be tailored to the location of the data processing system. For example, in order to track the location of the data processing system, hardware resources of the data processing system may periodically report a location of the data processing system. However, the reported location may not be accurate, up to date, and/or otherwise reliable for various reasons.

For example, the reported location may not reliable when the hardware resources are unpowered (e.g., unintentionally, or intentionally by a malicious party intending to conceal the location of the data processing system), when the hardware resources are compromised (e.g., by a malicious party intending to spoof the location), and/or in any other circumstances where the data processing system may be unable to accurately report a current location (e.g., the hardware resources may lack connection to a network).

In general, embodiments disclosed herein may provide methods, systems, and/or devices for managing operation of a data processing system based on its location. The data processing system may include out-of-band hardware components (e.g., a management controller) that may be used to report location data for the data processing system via an out-of-band communication channel. By reporting the location data using out-of-band components and via out-of-band communication channels, potentially compromised or inoperable hardware resources (e.g., in-band components) may be circumvented, decreasing the likelihood of the location data becoming compromised (e.g., unreliable).

Using the location data, the operation of the data processing system may be updated in order to manage (e.g., restrict) computer-implemented services provided by the data processing system. By managing the data processing system (e.g., and its computer-implemented services) based on reliable location data, the data processing system may be more likely to operate in compliance with policies applicable to the location.

To perform the above-mentioned functionality, the system of FIG. 1A may include data processing system 102, other devices 103, and/or geolocation management server 104. Data processing system 102, other devices 103, geolocation management server 104, and/or any other type of devices not shown in FIG. 1A may perform all, or a portion of the computer-implemented services independently and/or cooperatively. Each of these components is discussed below.

Data processing system 102 may include any number and/or type of data processing systems. Data processing system 102 may provide computer-implemented services according to its geographical location. To do so, data processing system 102 may include out-of-band components, such as a management controller, capable of exchanging data with other devices via out-of-band communication channels.

For example, the management controller of data processing system 102 may (i) provide data usable for determining its location (e.g., location data) to a first device via out-of-band communication channels, (ii) obtain data (e.g., computing instructions) from a second device via out-of-band communication channels, (iii) facilitate updating of the operation of data processing system 102 (e.g., based on the computing instructions), and/or (iv) perform other actions relating to providing the computer-implemented services according to its location. For more information regarding out-of-band components of data processing system 102, refer to FIG. 1B.

Data processing system 102 (e.g., the management controller) may provide location data to a device upon request (e.g., by the device) and/or automatically. For example, data processing system 102 may provide location data automatically (e.g., to registered devices) based on a schedule, upon (automatic) detection of a change (e.g., above a threshold) in location data, etc. Data processing system 102 may provide location data, for example, to geolocation management server 104, which may participate in managing operation of data processing system 102.

To perform its functionality, geolocation management server 104 may (i) obtain location data (e.g., via out-of-band communication channels, from the management controller of data processing system 102), (ii) monitor, manage and/or store location data (e.g., in a repository, not shown), (iii) obtain location requests from other devices (e.g., 103), (iv) perform location reporting processes to retrieve location data (e.g., from the repository), (v) provide responses to location requests (e.g., provide location data to other devices) and/or (vi) perform other tasks associated with managing the operation of data processing systems. For example, geolocation management server 104 may obtain (e.g., access), store, and/or provide computing instructions (e.g., an action set) for updating operation of a data processing system to be in accordance with a policies associated with a geographical location.

Geolocation management server 104 may provide location data and/or other data (e.g., computing instructions) to a device upon request, and/or automatically (e.g., to registered devices) based on a schedule, upon (automatic) detection of a change (e.g., above a threshold) in location data, etc. For example, geolocation management server 104 may provide location data to other devices 103 when requested by other devices 103.

Other devices 103 may include any number and/or type of user devices, servers, and/or other computing devices (e.g., that may request location data from geolocation management server 104). For example, other devices 103 may include a personal device that may be operated by a user, and the personal device may include an application usable for participating in the management of the operation of data processing system 102.

For example, a device of other devices 103 may include functionality for (i) generating and/or providing (e.g., to geolocation management server 104) a location request, (ii) obtaining location data (e.g., from geolocation management server 104) in response to the location request, and/or (iii) providing computer-implemented services using the location data. The computer-implemented services may include, for example, geo-tracking services, device provisioning services, etc.

Thus, when in-band components of data processing system 102 are unable to reliably transmit location data (e.g., due to being inoperable, security compromised, etc.), the location data may be provided securely by out-of-band components of data processing system 102 using out-of-band communication channels. By doing so, the location data may be more reliable and trustworthy for use in managing operation of data processing system 102.

Figure 3:
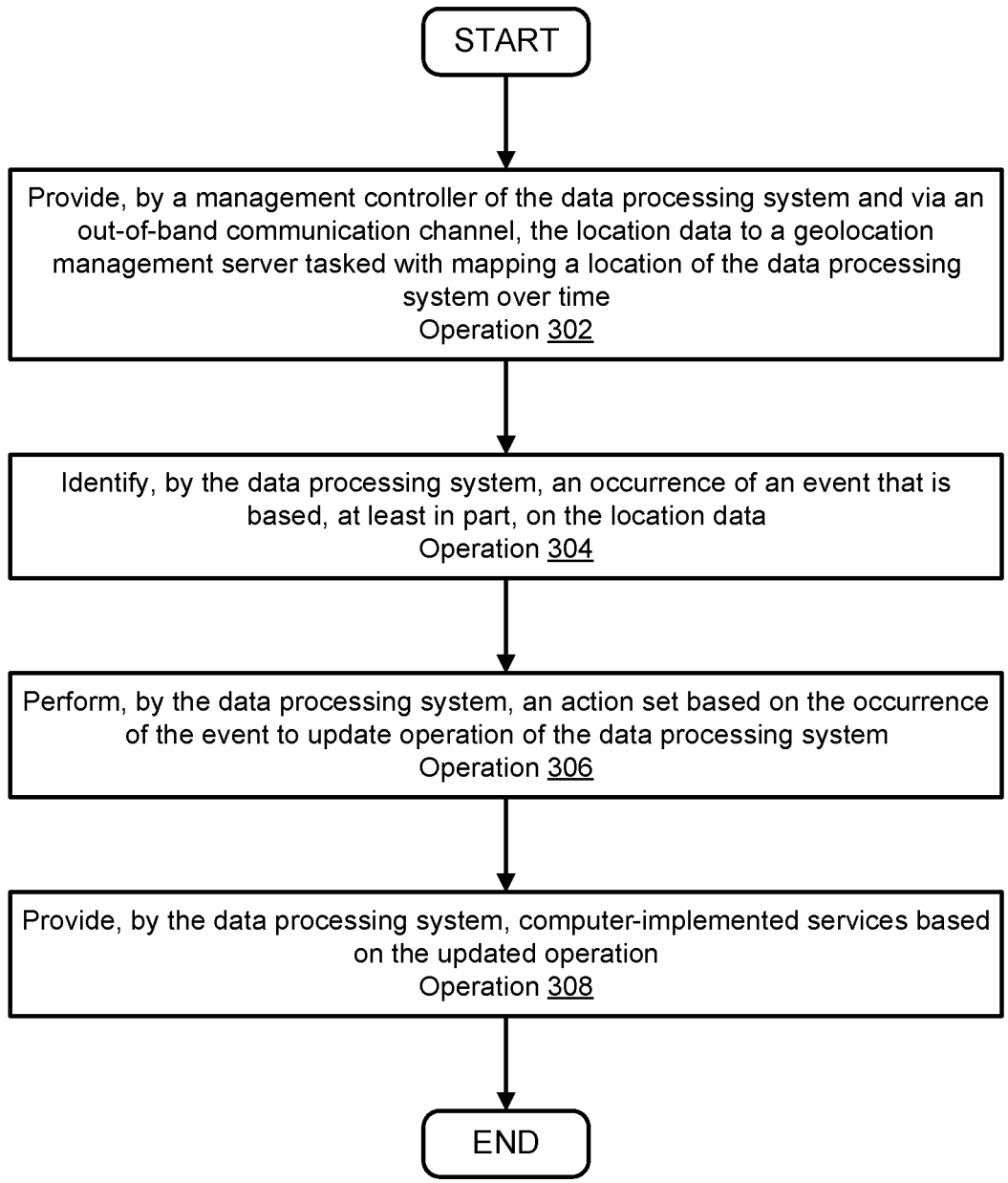
FIG. 3 shows a flow diagram illustrating a method for managing a data processing system based on location data in accordance with an embodiment.

When providing their functionality, any of data processing system 102, other devices 103, and/or geolocation management server 104 may perform all, or a portion of the methods shown in FIG. 3.

Any of (and/or components thereof) data processing system 102, other devices 103, and/or geolocation management server 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to FIG. 4.

In an embodiment, one or more of data processing system 102, other devices 103, and/or geolocation management server 104 are implemented using an internet of things (IoT) device, which may include a computing device. The IoT device may operate in accordance with a communication model and/or management model known to data processing system 102, other devices 103, geolocation management server 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein. For example, while the system of FIG. 1A shows a single geolocation management server (e.g., 104), it will be appreciated that the system may include any number of geolocation management servers.

Figure 1B:
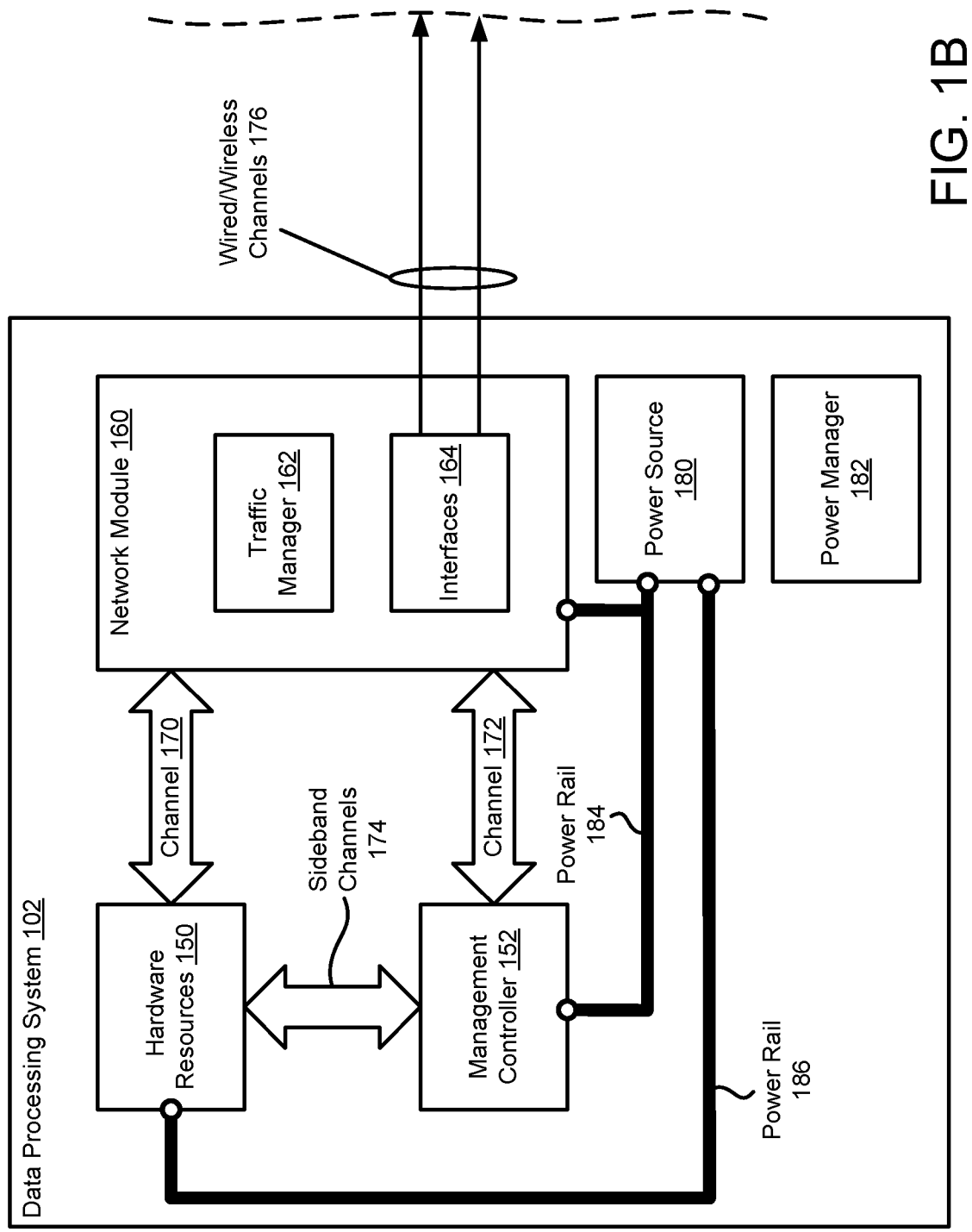
FIG. 1B shows a block diagram illustrating a data processing system in accordance with an embodiment.

Turning to FIG. 1B, a diagram illustrating a data processing system in accordance with an embodiment is shown. The data processing system (e.g., data processing system 102) shown in FIG. 1B may be similar to any of the computing devices (e.g., data processing system 102) shown in FIG. 1A.

To provide computer-implemented services, data processing system 102 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, then these entities may subsequently compromise the operation of the applications. For example, if various drivers and/or the communication stack are compromised, then communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150 of a host data processing system 102). Management controller 152 may provide various management functionalities for data processing system 102. For example, management controller 152 may monitor various ongoing processes performed by the in-band components, may manage power distribution, thermal management, and/or may perform other functions for managing data processing system 102.

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152.

Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted components may not result in indirect compromise of any management controller 152, and entities hosted by management controller 152.

For example, management controller 152 may provide location data to a geolocation management server (e.g., 104) independently of potentially compromised hardware resources 150, reducing the likelihood of the location data becoming compromised (e.g., modified, leaked, and/or otherwise used for nefarious purposes).

To facilitate communication with other devices, data processing system 102 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

For example, a geolocation management server (e.g., 104) may address a message to a network endpoint advertised by network module 160 for out-of-band communications. The message may include computing instructions for updating operation of data processing system 102 based on its reported location. Once the message is received by traffic manager 162, traffic manager 162 may then forward the message to management controller 152 via an out-of-band communication channel (e.g., channel 172), differentiating the message from in-band communications to data processing system 102.

Thus, if in-band components of data processing system 102 are unsecured and/or compromised (e.g., by a malicious party), then the computing instructions sent using out-of-band components and via out-of-band communication channels may be less likely to be intercepted and/or modified (e.g., by the malicious party), and the operation of data processing system 102 may be more likely to be updated according to its reported location.

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a Wi-Fi card, a wireless local area network card, a wired local area network card, an optical communication card, and/or other types of communication components. These component may support any number of wired/wireless channels 176.

Thus, from the perspective of an external device, the in-band components and out-of-band components of data processing system 102 may appear to be two independent network entities, that may be independently addressable and/or otherwise unrelated to one another.

To facilitate management of data processing system 102 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. Therefore, if hardware resources 150 become unavailable (e.g., due to being unpowered), then out-of-band components may remain powered, allowing network module 160 to continue to generate location data for data processing system 102.

To implement the separate power domains, data processing system 102 may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) that may manage power from power source 180 may be supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

To further clarify embodiments disclosed herein, an interaction diagram in accordance with an embodiment is shown in each of FIGS. 2A-2D. The interaction diagrams may illustrate examples of how data may be obtained and used within the systems of FIGS. 1A-1B.

In the interaction diagrams, processes performed by and interactions between components of a system in accordance with an embodiment are shown. In the diagrams, components of the system are illustrated using a first set of shapes (e.g., 150, 152, etc.), located towards the top of each figure. Lines descend from these shapes. Processes performed by the components of the system are illustrated using a second set of shapes (e.g., 208, 226 etc.) superimposed over these lines.

Interactions (e.g., communication, data transmissions, etc.) between the components of the system are illustrated using a third set of shapes (e.g., 202, 204, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 204 may occur prior to the interaction labeled as 206. However, it will be appreciated that the processes and interactions may be performed in different orders, any may be omitted, and other processes or interactions may be performed without departing from embodiments disclosed herein.

Some of the lines descending from the first set of shapes are interrupted with line breaks. The line breaks may indicate, for example, a passage of time (e.g., between interactions and/or processes occurring above the line break and below other interactions and/or processes occurring below the line break), during which activity and/or events may occur.

Some of the lines descending from some of the first set of shapes (e.g., 150) are drawn in dashing to indicate, for example, that the corresponding components may not be (i) operable, (ii) powered on, (iii) present in the system, and/or (iv) not participating in operation of the system for other reasons.

The processes shown in FIGS. 2A-2D may be performed by any entity shown in the systems of FIGS. 1A-1B (e.g., a device similar to one of data processing system 102, a server similar to geolocation management server 104, etc.) and/or another entity without departing from embodiments disclosed herein.

Figure 2A:
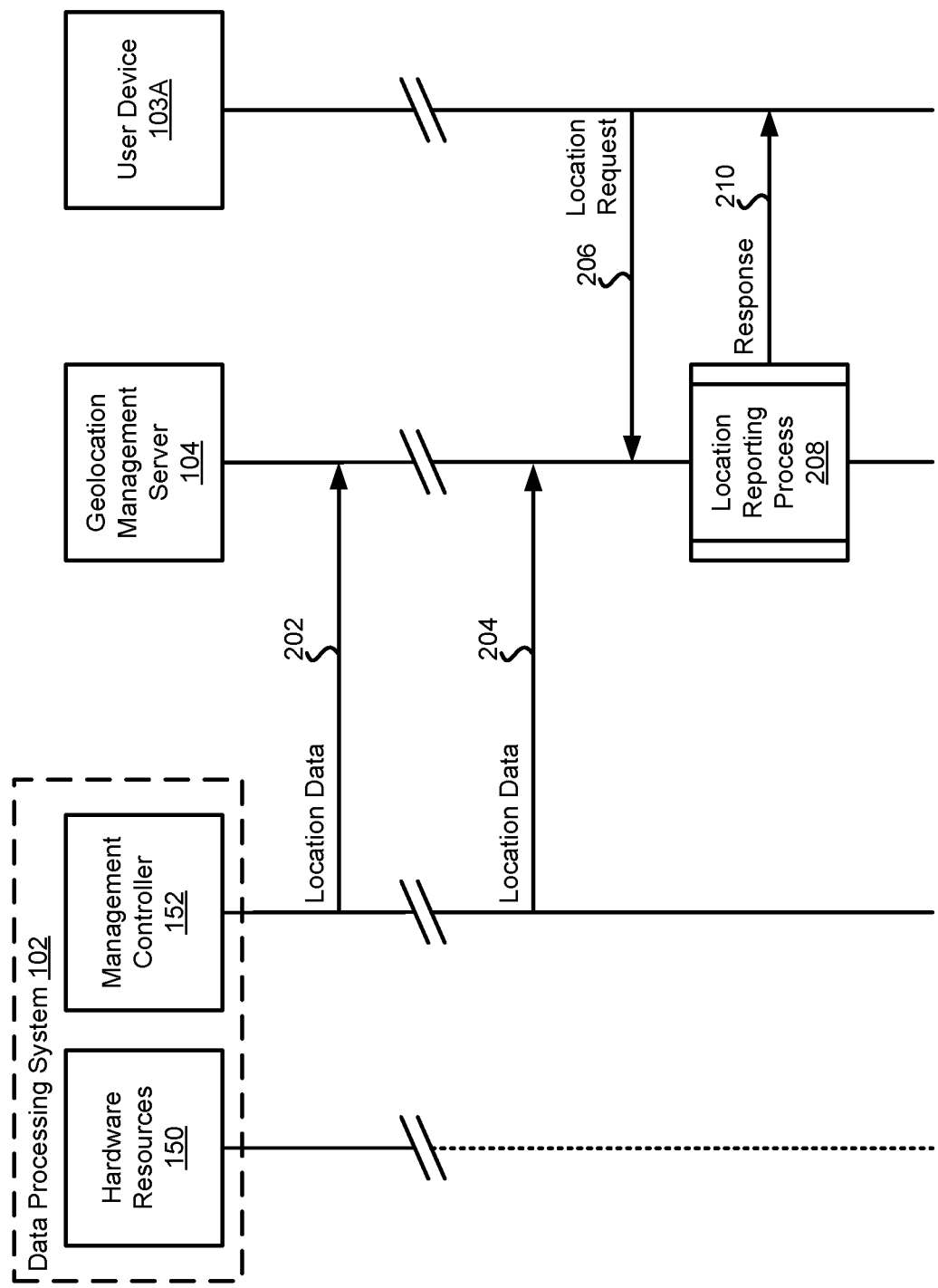
FIG. 2A shows an interaction diagram illustrating an example of obtaining a location for a data processing system in accordance with an embodiment.

Turning to FIG. 2A, a first interaction diagram in accordance with an embodiment is shown. The first interaction diagram may illustrate processes and interactions that may occur in order to obtain a location of a data processing system. For example, data processing system 102 may include a portable device that may provide computer-implemented services to a user of the portable device. As discussed with respect to FIGS. 1A-1B, data processing system 102 may include hardware resources 150 and management controller 152. Over time, management controller 152 may provide location data (e.g., usable to obtain a location of data processing system 102) to a geolocation management server (e.g., 104).

At interaction 202, the location data may be provided to geolocation management server 104 by management controller 152. For example, the location data may be generated (e.g., by a network module of data processing system 102) and provided (e.g., via an out-of-band communication channel that may use a network such as a WWAN) to geolocation management server 104 via (i) transmission via a message, (ii) storing in a storage with subsequent retrieval by geolocation management server 104, (iii) a publish-subscribe system where geolocation management server 104 subscribes to updates from management controller 152 thereby causing a copy of the location data to be propagated to geolocation management server 104, and/or (iv) other processes. By providing the location data to geolocation management server 104, geolocation management server 104 may provide location data management services.

To provide location data management services, geolocation management server 104 may obtain the location data and/or store the location data (e.g., in a repository that may be managed by a database, not shown). As discussed with respect to FIG. 1A, management controller 152 may provide location data to geolocation management server 104 periodically over time (e.g., based on a schedule, based on detected changes in location, etc.); therefore, geolocation management server 104 may monitor (e.g., track and/or map) the location of data processing system 102 over time, and/or may store location history of data processing system 102.

The line breaks occurring after interaction 202 may indicate the passage of a period of time during which an event may occur. For example, the dashing line below the line break in the line descending from hardware resources 150 may indicate that, during the period of time, hardware resources 150 became unavailable (e.g., inoperable, unpowered, compromised, and/or may otherwise not be participating in operation of data processing system 102).

While hardware resources 150 are unavailable, management controller 152 may remain available (e.g., operable, powered, uncompromised, etc.) and may continue to provide location data to geolocation management server 104 independently from the unavailable hardware resources 150. For example, if hardware resources 150 are unpowered, then hardware resources 150 may not be able to provide up to date (e.g., current) location data to geolocation management server 104. Or, for example, if hardware resources 150 are compromised by a malicious party, then the malicious party may be able to intercept and/or modify the location data before providing it to geolocation management server 104 (e.g., in order to spoof the location of data processing system 102). Therefore, by providing location data for data processing system 102 using out-of-band hardware (e.g., management controller 152) and via out-of-band communication channels, the location data may be more reliable than if the location data is provided using hardware resources 150 (via in-band communication channels).

At interaction 204, (current) location data may be provided to geolocation management server 104 by management controller 152. Refer to the description of interaction 202 for more details regarding management controller 152 providing location data to geolocation management server 104. By providing the (current) location data to geolocation management server 104, geolocation management server 104 may (continue to) provide location data management services and/or location services via other devices (e.g., 103).

For example, geolocation management server 104 may provide location services (e.g., location tracking services) to user device 103A. User device 103A may include a smartphone or other portable device accessible to a user (or administrator) of data processing system 102. For example, user device 103A may host an application running on geolocation management server 104 usable to locate and/or track the location of data processing system 102. Using the application, the user may initiate a request for location services (e.g., a location request) in order to obtain a location of data processing system 102.

The location request may include (i) identifying information for the user, user device 103A, and/or the device for which the location services are requested (e.g., data processing system 102), (ii) authentication information (e.g., usable to authenticate the user and/or devices), and/or (iii) any other information usable for securely obtaining a location of data processing system 102.

At interaction 206, the location request may be provided to geolocation management server 104 by user device 103A. For example, the location request may be generated (e.g., by an application hosted by user device 103) and provided to geolocation management server 104 via (i) transmission via a message, (ii) storing in a storage with subsequent retrieval by geolocation management server 104, (iii) a publish-subscribe system where geolocation management server 104 subscribes to updates from other devices (e.g., user device 103A) thereby causing a copy of the location request to be propagated to geolocation management server 104, and/or (iv) other processes. By providing the location request to geolocation management server 104, geolocation management server 104 may provide location services.

To provide the location services, geolocation management server 104 may perform location reporting process 208. Location reporting process 208 may be initiated, for example, by obtaining the location request from user device 103A. Location reporting process 208 may include performing authentication processes (e.g., to authenticate the user, user device 103A, and/or to verify that the authenticated user and/or user device 103A have authorization to access location data for data processing system 102). During location reporting process 208, geolocation management server 104 may use historical and/or current location data (e.g., obtained by management controller 152) to map a location (or a series of locations over time) of data processing system 102.

Location reporting process 208 may include generating a response to the location request. The response may be based, at least in part, on the result of the authentication and/or verification processes. For example, if both the user and the device(s) are successfully authenticated, then the response may include location information (e.g., a location and a corresponding time, or a series of mapped locations and corresponding times) for data processing system 102; however, if both the user and the device(s) are not successfully authenticated, then the response may not include the location information and/or may include a message that may indicate that access to the location data for data processing system 102 is denied.

In some cases, geolocation management server 104 may provide a location and/or corresponding time automatically (e.g., without first obtaining a location request from user device 103A). For example, if real-time location tracking is enabled for data processing system 102 in the application hosted by user device 103A, then geolocation management server 104 may perform location reporting process 208 (e.g., periodically, without prompt from user device 103A), and/or may push the response to the application hosted by user device 103A.

At interaction 210, the response may be provided to user device 103A by geolocation management server 104. For example, the response may be provided to user device 103A (e.g., the application hosted by user device 103A) via (i) transmission via a message, (ii) storing in a storage with subsequent retrieval by user device 103A, (iii) a publish-subscribe system where user device 103A subscribes to updates from geolocation management server 104, thereby causing a copy of the response to be propagated to user device 103A, and/or (iv) other processes. By providing the response to user device 103A, user device 103A may provide location services for data processing system 102, allowing the user to obtain a location for data processing system 102.

Thus, as shown in the example of FIG. 2A, out-of-band components of a data processing system (e.g., a management controller) may be used to securely manage and/or provide location data (via out-of-band communication channels) to entities that may provide location services for the data processing system. By doing so, the location data that may support the location services may be more likely to be reliable and trusted for use in managing location-based operation of the data processing system.

Figure 2B:
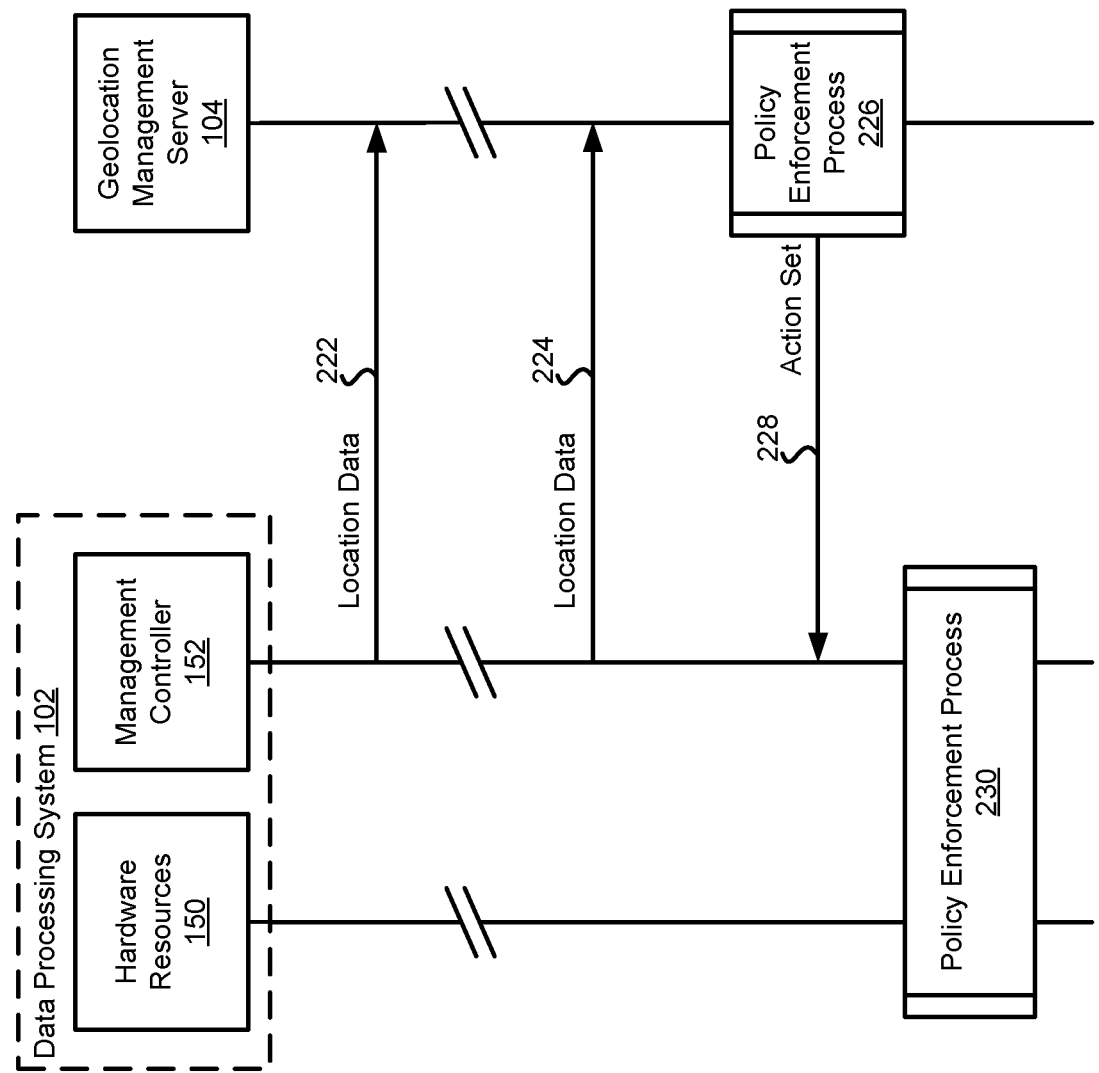
FIGS. 2B-2D show interaction diagrams illustrating examples of managing data processing systems based on location data in accordance with an embodiment.

Turning to FIG. 2B, a second interaction diagram in accordance with an embodiment is shown. The second interaction diagram may illustrate processes and interactions that may occur in order to obtain an action set for updating a data processing system based on location data for the data processing system. For example, data processing system 102 may be present at a first location within a first geographical area, and may be operating in compliance with policies corresponding to the first geographical area. As discussed with respect to FIG. 2A, management controller 152 may provide location data for data processing system 102 to geolocation management server 104.

At interaction 222, the location data may be provided to geolocation management server 104 by management controller 152. Refer to interaction 202 of FIG. 2A for more details regarding management controller 152 providing location data to geolocation management server 104. By providing the location data to geolocation management server 104, geolocation management server 104 may provide location data management services and/or location services.

Geographical management server 104 may monitor location data for (e.g., track the location of) data processing system 102 in order to enforce location-based policies relating to the operation of data processing system 102. For example, the location data obtained by geolocation management server 104 in interaction 222 may indicate that data processing system 102 has remained in the first location, and therefore remains operationally compliant with policies keyed to the first geographical area.

The line breaks occurring after interaction 222 may indicate a passage of a period of time during which an event may occur. In this example, the event may include data processing system 102 entering or leaving a defined geographical area. For example, during the period of time, data processing system 102 may be moved (e.g., by a user) from a first location to a second location.

At interaction 224, after data processing system 102 has been relocated, location data may be provided to geolocation management server 104 by management controller 152. Refer to the description of interaction 202 of FIG. 2A for more details regarding management controller 152 providing location data to geolocation management server 104. By providing the location data to geolocation management server 104, geolocation management server 104 may (continue to) provide location data management services and/or location services.

For example, the location data obtained by geolocation management server 104 may indicate that data processing system 102 has been relocated to a second location that is outside of the first geographical area and/or within in a second geographical area, constituting a geo-excursion. Upon detecting the geo-excursion, geolocation management server 104 may initiate policy enforcement process 226 in order to provide the location services (e.g., geo-fencing services).

During policy enforcement process 226, geological management server 104 may identify policies corresponding to the second location. For example, different policies may be keyed to different geographical areas. Consequently, when a device is moved from a first geographical area to a second geographical area, geolocation management server 104 may use the second geographical area as a key to identify the corresponding policies that apply. Policy enforcement process 226 may include obtaining (e.g., generating) an action set corresponding to the identified policies. The action set may include instructions for limiting use of at least one function of data processing system 102 (e.g., locking data processing system 102 down, wiping data from data processing system 102, etc.).

At interaction 228, the action set may be provided to management controller 152 by geolocation management server 104. For example, the action set may be generated and provided (e.g., via an out-of-band communication channel that may use a network such as a WWAN) to management controller 152 via (i) transmission via a message, (ii) storing in a storage with subsequent retrieval by management controller 152, (iii) a publish-subscribe system where management controller 152 subscribes to updates from geolocation management server 104 thereby causing a copy of the action set to be propagated to management controller 152, and/or (iv) other processes. By providing the action set to management controller 152, management controller 152 may perform a policy enforcement process complementary to policy enforcement process 226.

Upon obtaining the action set, data processing system 102 (e.g., management controller 152) may identify an occurrence of an event (e.g., receiving the action set from geolocation management server 104). Based on the occurrence of the event, management controller 152 may initiate policy enforcement process 230 in order to update operation of data processing system 102. During policy enforcement process 230, management controller 152 may communicate with hardware resources 150 by exchanging information over sideband channels (e.g., 172). For example, management controller 152 may provide information to hardware resources 150 in order to execute instructions included in the action set. Policy enforcement process 230 may include performing an action of the action set, which may result in an update to the operation of hardware resources 150 (e.g., data processing system 102).

Performing the action set may include, for example, (i) disabling (or enabling) one or more of hardware resources 150, (ii) disabling (or enabling) one or more pieces of software hosted by hardware resources 150, (iii) increasing (or decreasing) authentication requirements (e.g., for access to a portion of functionality of data processing system 102), (iv) removing a portion of data stored by data processing system 102, (v) continuing to provide (by management controller 152) location data, and/or (vi) other actions relating to updating operation of data processing system 102 in order to enforce a change in policy (e.g., initiating a provisioning process for data processing system 102 (refer to the discussion of FIGS. 2C-2D for more information regarding provisioning processes)). For example, performing the action set may include powering off hardware resources 150 and/or disabling functionality for powering hardware resources 150 (e.g., for a period of time and/or until location data for data processing system 102 indicates the functionality should be enabled).

Thus, as shown in the example of FIG. 2B, location data for a data processing system that is provided using out-of-band methods (e.g., using out-of-band components and/or via out-of-band communication channels) may be trusted to enforce location-based policies. The policies may be enforced automatically based on the location data, for example, by modifying (e.g., updating) operation of the data processing system. The operational updates may reflect changes in policies associated with a relocation of the data processing system, and/or may otherwise prevent the data processing system from providing computer-implemented services that may be out of compliance.

Figure 2C:
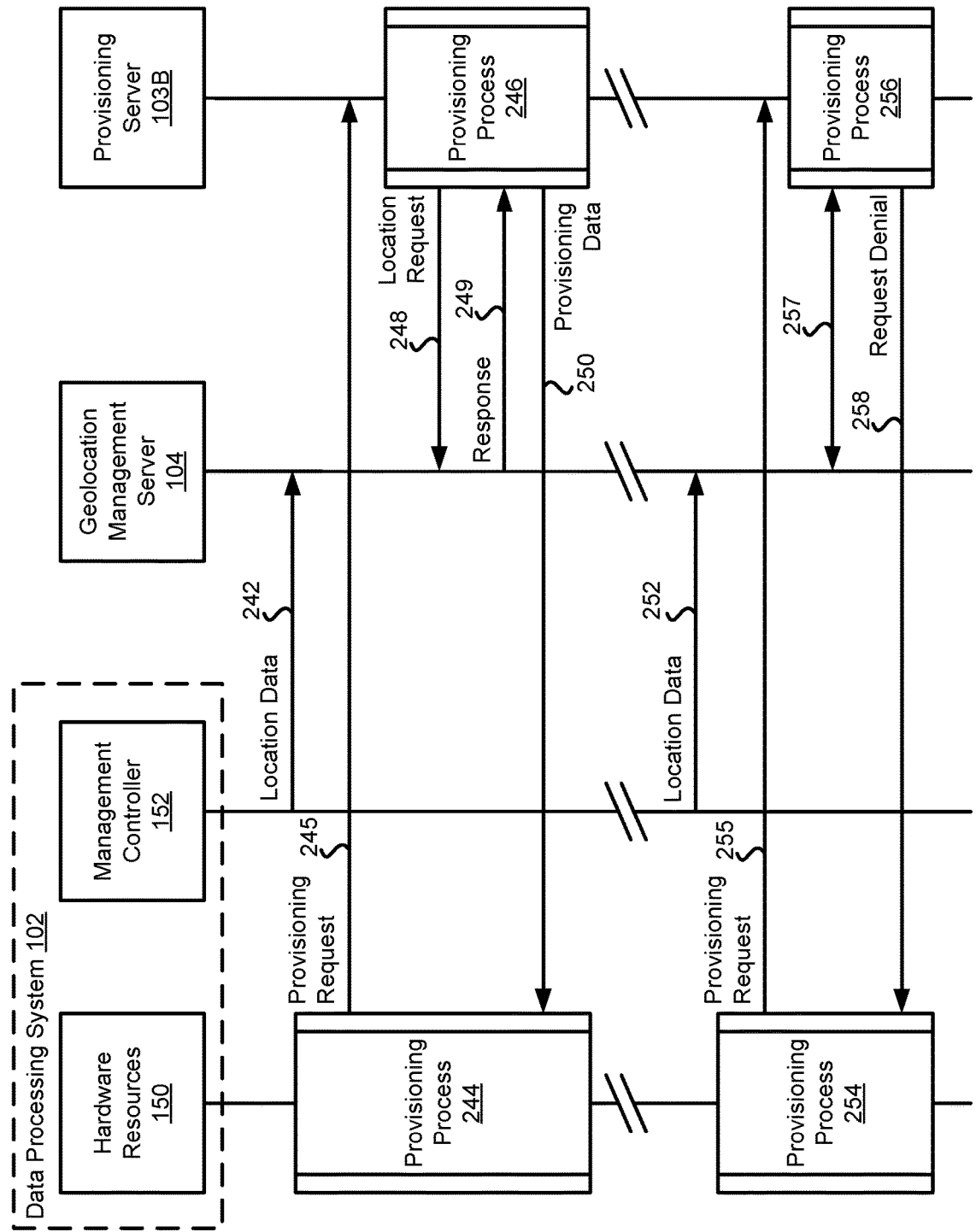

Turning to FIG. 2C, a third interaction diagram in accordance with an embodiment is shown. The third interaction diagram may illustrate processes and interactions that may occur during a provisioning process for a data processing system. For example, data processing system 102 may be present a first location within a first geographical area with corresponding policies regarding provisioning of data processing system 102. As discussed with respect to FIGS. 2A-2B, management controller 152 may provide location data for data processing system 102 to geolocation management server 104.

At interaction 242, the location data (e.g., indicating the first location) may be provided to geolocation management server 104 by management controller 152. Refer to interaction 202 of FIG. 2A for more details regarding management controller 152 providing location data to geolocation management server 104. Geolocation management server 104 may use the location data to provide location services, for example, during a provisioning process for data processing system 102.

Hardware resources 150 may initiate provisioning process 244, for example, in order to update configuration settings of, install software on, and/or otherwise update operation of data processing system 102. During provisioning process 244, hardware resources 150 may obtain (e.g., generate) a provisioning request. The provisioning request may include, for example, (i) identifying information (e.g., for data processing system 102 and/or a user thereof), (ii) authentication information (e.g., usable to authenticate data processing system 102 and/or the user), and/or (iii) any other information usable for obtaining provisioning services for data processing system 102.

At interaction 245, the provisioning request may be provided (e.g., via an in-band communication channel that may use a network other than a WWAN) to provisioning server 103B via (i) transmission via a message, (ii) storing in a storage with subsequent retrieval by provisioning server 103B, (iii) a publish-subscribe system where provisioning server 103B subscribes to updates from hardware resources 150 thereby causing a copy of the provisioning request to be propagated to provisioning server 103B, and/or (iv) other processes. By providing the provisioning request to provisioning server 103B, provisioning server 103B may perform a provisioning process complementary to provisioning process 244.

Provisioning server 103B may obtain the provisioning request (e.g., from hardware resources 150 or another device, such as user device 103A). Based on information included in the provisioning request (e.g., based on if provisioning server 103A is able to authenticate data processing system 102), provisioning server may initiate provisioning process 246. Provisioning process 246 may include obtaining a (current) location of data processing system 102.

To obtain the location of data processing system 102, provisioning process may generate a location request and, at interaction 248, may provide the location request to geolocation management server 104. Refer to the discussion of FIG. 2A (e.g., interaction 206) for more details regarding location requests.

Geolocation management server 104 may obtain the location request, may obtain a response to the location request (e.g., by performing a location reporting process) and, at interaction 249, may provide the response to provisioning server 103B. Refer to the discussion of FIG. 2A (e.g., location reporting process 208, interaction 210) for more details regarding obtaining the response and providing the response (e.g., to provisioning server 103B). By providing the response to provisioning server 103B, provisioning server 103B may use the response to complete provisioning process 246.

Provisioning process 246 may include obtaining the response from geolocation management server 104. The response may include and/or indicate a location (e.g., the first location) of data processing system 102. During provisioning process 246, provisioning server 103A may use the first location to identify whether data processing system 102 is eligible for provisioning (e.g., to identify a level of provisioning for data processing system 102). The level of provisioning may reflect, for example, which configuration settings, software, etc., of data processing system 102 may be modified, added, etc. The level of provisioning may be limited based on location, for example, to increase security (e.g., to prevent data processing system 102 from operating in a manner that may compromise sensitive data) and/or to prevent data processing system 102 from providing computer-implemented services that violate any applicable policies.

To identify the level of provisioning, provisioning server 103B may identify a set of policies for data processing system 102 that are keyed to the first location. In this example, the level of provisioning corresponding to policies keyed to the first location (e.g., the first geographical area) may include partial provisioning or full provisioning. Provisioning process 246 may include obtaining provisioning data based on the identified set of policies. The provisioning data may include instructions (e.g., an action set), software, etc., usable by hardware resources 150 to update configuration settings, install software, store data, and/or perform any other actions associated with provisioning of data processing system 102.

At interaction 250, the provisioning data may be provided (e.g., via the in-band communication channel) to hardware resources 150 via (i) transmission via a message, (ii) storing in a storage with subsequent retrieval by hardware resources 150, (iii) a publish-subscribe system where hardware resources 150 subscribes to updates from provisioning server 103B thereby causing a copy of the provisioning data to be propagated to hardware resources 150, and/or (iv) other processes. By providing the provisioning data to hardware resources 150, hardware resources 150 may complete provisioning process 244.

Hardware resources 150 may complete provisioning process 244 by, for example, obtaining the provisioning data, and performing actions indicated by the provisioning data (e.g., generating and executing instructions based on the provisioning data) that may update the operation of data processing system 102.

The line breaks occurring below interaction 250, provisioning process 244, and provisioning process 246 may indicate a passage of a period of time during which an event may occur. In this example, the event may include data processing system 102 entering or leaving a defined geographical area. For example, during the period of time, data processing system 102 may be moved from the first location to a second location (e.g., into a new geographical area).

At interaction 252, the new location data (e.g., indicating data processing system is in the second location) may be provided to geolocation management server 104 by management controller 152. Refer to interaction 202 of FIG. 2A for more details.

A similar distributed provisioning process (254-257) may be performed. However, due to data processing system 102 being in the new geographic area, provisioning process 256 may identify that data processing system 102 is no longer eligible for provisioning based on its location. Consequently, at interaction 258, a request denial may be generated and provided to data processing system 102 via the in-band communication channel (e.g., rather than providing the provisioning data at interaction 250).

Figure 2D:
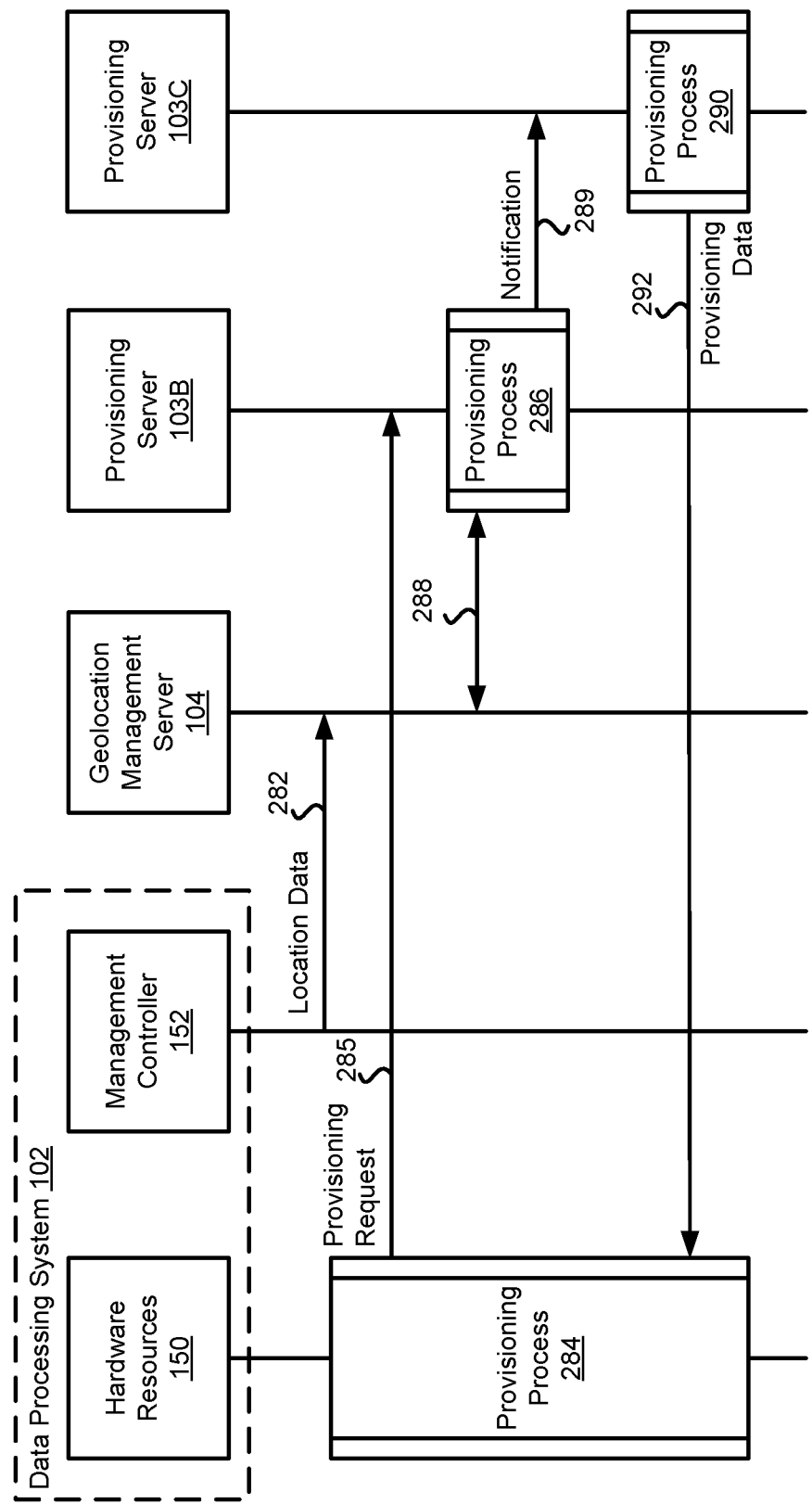

Turning to FIG. 2D, a fourth interaction diagram in accordance with an embodiment is shown. The fourth interaction diagram may illustrate processes and interactions that may occur during a provisioning process for a data processing system.

At interaction 282, management controller 152 may provide location data for data processing system 102 to geolocation management server 104 via an out-of-band communication channel. Refer to interaction 202 of FIG. 2A for more details.

Hardware resources 150 may initiate a provisioning process similar to provisioning process 244 of FIG. 2C. To do so, at interaction 285, hardware resources 150 may generate and provide a provisioning request to provisioning server 103B via an in-band communication channel. Refer to interaction 245 of FIG. 2C for more details.

Provisioning server 103B may obtain the provisioning request and initiate provisioning process 286, which may be similar to provisioning process 246 of FIG. 2C. Provisioning process 288 may include generating a location request for data processing system 102.

At interaction 288, the location request may be provided to geolocation management server 104 and geolocation management server 104 may provide a response to the location request that may indicate the location of data processing system 102.

During provisioning process 288, provisioning server 103B may use the location of data processing system 102 to identify a provisioning server (e.g., 103B or another provisioning server such as 103C). For example, provisioning server 103B may identify a provisioning server that is closest (geographically) to data processing system 102 and/or a provisioning server that is authorized to provide the requested provisioning services to data processing system 102. In this example, provisioning server 103B may identify provisioning server 103C, and may generate a notification based on the identification.

At interaction 289, the notification may be provided to provisioning server 103C from provisioning server 103B. For example, the notification may be provided to provisioning server 103C via (i) transmission via a message, (ii) storing in a storage with subsequent retrieval by provisioning server 103C, (iii) a publish-subscribe system where provisioning server 103C subscribes to updates from provisioning server 103B thereby causing a copy of the notification to be propagated to provisioning server 103C, and/or (iv) other processes. The notification may include, for example, the provisioning request and/or other information usable to establish an in-band communication channel with hardware resources 150 of data processing system 102. By providing the notification to provisioning server 103C, provisioning server 103C may provide the requested provisioning services.

Upon obtaining the notification, provisioning server 103C may perform provisioning process 290, which may be similar to provisioning process 246 of FIG. 2C. During provisioning process 290, at interaction 292, provisioning data may be provided to data processing system 102 (e.g., similar to interaction 250 of FIG. 2C).

Thus, as illustrated by the examples of FIGS. 2C-2D, provisioning processes for a data processing system may be managed based on location data obtained from the data processing system using out-of-band methods. The location data may be used to identify a (local and/or nearby) provisioning server with appropriate infrastructure for provisioning the data processing system securely and efficiently. The location data may also be used to regulate a level of provisioning of the data processing system based on its current location, for example, in low security and/or high security risk locations. By doing so, the likelihood of the data processing systems providing desired (e.g., policy compliant, secure, uninterrupted, etc.) computer-implemented services may be increased.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2D may perform various methods to manage (operation of) data processing systems in order to increase the likelihood of providing desired computer-implemented services.

FIG. 3 illustrates a method that may be performed by the components of the system of FIGS. 1A-2D. In the diagrams discussed below and shown in FIG. 3, any of the operations may be repeated, performed in different orders, and/or performed in parallel with or in a partially overlapping in time manner with other operations. The method described with respect to FIG. 3 may be performed by a data processing system, and/or another device.

Turning to FIG. 3, a flow diagram illustrating a method for managing a data processing system based on location data is shown in accordance with an embodiment.

At operation 302, the management controller of the data processing system may provide the location data to a geolocation management server. The location data may be provided using any of the methods described with respect to FIGS. 2A-2D. For example, to avoid using any potentially unavailable hardware resources (e.g., in-band components) of the data processing system, the location data may be generated by out-of-band components of the data processing system and/or may be provided (e.g., transmitted) via an out-of-band communication channel.

Using the location data, the geolocation management server may be tasked with mapping a location of the data processing system over time. To do so, the geolocation management server may, for example, obtain location data for the data processing system over time, interpret the location data to obtain locations of the data processing system, and/or report locations of the data processing system to other devices. Refer to the discussion of FIG. 2A for more information regarding location data management and/or location reporting processes.

At operation 304, the data processing system may identify an occurrence of an event that is based, at least in part, on the location data. The data processing system may identify the occurrence of the event by (i) obtaining information from other devices (e.g., receiving an action set from the geolocation management server via an out-of-band communication channel), (ii) obtaining reports from and/or monitoring activity of the hardware resources (e.g., via a sideband communication channel), and/or (iii) via other methods that may indicate the occurrence of the event.

As a first example, the event may include reception of (e.g., obtaining) an action set from the geolocation management server. The action set may be generated based on the location data and may be usable to update operation of the data processing system to enforce policies associated keyed to the location data. Refer to the example discussed with respect to FIG. 2B for more information regarding policy enforcement processes.

As a second example, the event may include initiating, by hardware resources of the data processing system, a provisioning process. To identify the occurrence of the provisioning process, the management controller may, for example, snoop (e.g., monitor) activity of and/or processes performed by the hardware resources (e.g., some activity and/or processes may indicate initiation of the provisioning process has occurred).

The provisioning process may be initiated, for example, by sending, by the hardware resources, a provisioning request to a first provisioning server. In response, the hardware resources may obtain a provisioning response from the first provisioning server or a second provisioning server, depending on the location data. The provisioning response may include, for example, a notification indicating the provisioning request has been accepted or denied and/or provisioning data (e.g., including an action set) for performing the provisioning process. Refer to the examples discussed with respect to FIGS. 2C-2D for more information regarding initiation and performance of provisioning processes.

At operation 306, the data processing system may perform an action set based on the occurrence of the event to update operation of the data processing system. The action set may include instructions, software, and/or other data usable for updating operation of the data processing system. Therefore, the action set may be performed by (i) generating (additional) instructions based on the action set, and/or (ii) executing instructions (e.g., initiating processes, updating configuration settings, downloading data, installing software, etc.).

For example, performing the action set may include limiting, by the management controller, use of at least one function of the data processing system. To limit the use of the at least one function, management controller may generate and/or execute instructions that (i) disable a portion of the hardware resources, and/or (ii) disable a piece of software hosted by the hardware resources. Performing the action set may also include generating and/or executing instructions for enabling functionality of the hardware resources and/or enabling or adding software hosted by the hardware resources.

At operation 308, the data processing system may provide computer-implemented services based on the updated operation. The computer-implemented services may be provided by initiating functionality of the hardware resources of the data processing system. For example, a user of the data processing system may initiate execution of computer instructions that may be performed by the (updated) hardware resources of the data processing system. The computer-implemented services may be more likely to include desired (e.g., secure and/or otherwise policy compliant) computer-implemented services when performed using the updated hardware resources.

The method may end following operation 308.

As illustrated above, embodiments disclosed herein may provide systems and methods usable to manage data processing systems based on location data that is managed (e.g., generated, provided, etc.) using out-of-band methods. By managing the location data of without relying on in-band methods (which may be inoperable and/or unsecure), the likelihood of the location data being modified, leaked, and/or otherwise compromised may be reduced, resulting in more reliable and/or trustworthy location data. The operation of the data processing system may be managed using the location data automatically and/or in real-time, reducing the likelihood of service disruptions, policy violations, and/or security issues that may arise while providing computer-implemented services. Accordingly, the disclosed process provides for both an embodiment in computing technology and an improved method for managing the security of data processing systems.

Figure 4:
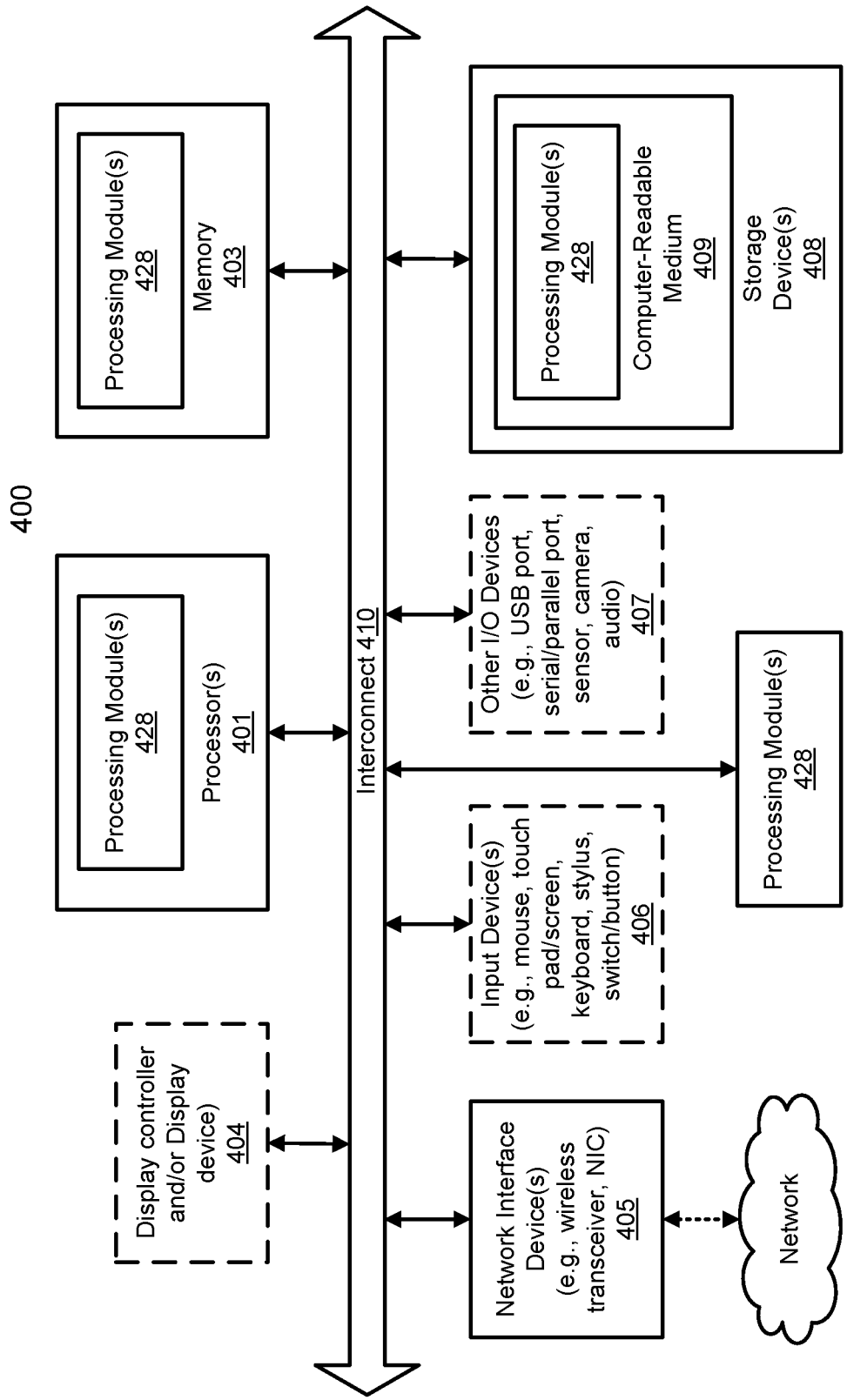
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system based on location data, the method comprising:
   providing, by a management controller that is physically installed within the data processing system and via an out-of-band communication channel, the location data to a geolocation management server tasked with mapping a location of the data processing system over time, wherein the data processing system comprises a single network module that is shared by the management controller and hardware resources of the data processing system, the single network module is adapted to separately advertise network endpoints for the management controller and the hardware resources such that first network communications meant for the hardware resources never flow through the management controller and second network communications meant for the management controller never flow through the hardware resources;
   identifying, by the data processing system, an occurrence of an event that is based, at least in part, on the location data;
   performing, by the data processing system, an action set based on the occurrence of the event to update operation of the data processing system; and
   providing, by the data processing system, computer-implemented services based on the updated operation.

2. The method of claim 1, wherein in an instance of the event where the event is reception of the action set from the geolocation management server:
   performing the action set comprises:
   limiting, by the management controller, use of at least one function of the data processing system.

3. The method of claim 2, wherein limiting the use of the at least one function comprises:
   disabling, by the management controller, a portion of the hardware resources of the data processing system.

4. The method of claim 3, wherein limiting the use of the at least one function further comprises:
   disabling, by the management controller, a piece of software hosted by the hardware resources of the data processing system.

5. The method of claim 1, wherein in an instance of the event where the event is initiating, by the hardware resources of the data processing system, a provisioning process:
   sending, by the hardware resources, a provisioning request to a first provisioning server.

6. The method of claim 5, wherein in the instance of the event where the event is initiating, by the hardware resources, the provisioning process:
   obtaining, by the hardware resources and from the first provisioning server, a provisioning response that is responsive to the provisioning request and based on the location data.

7. The method of claim 5, wherein in the instance of the event where the event is initiating, by the hardware resources, the provisioning process:
   obtaining, by the hardware resources and from a second provisioning server, a provisioning response that is responsive to the provisioning request and based on the location data.

8. The method of claim 1, wherein the data processing system comprises a single network module that is shared by both of the management controller and the hardware resources, the single network module being adapted to separately advertise network endpoints for the management controller and the hardware resources such that first network communications meant for the hardware resources never flow through the management controller and second network communications meant for the management controller never flow through the hardware resources, the network endpoints being are usable by the geolocation management server to respectively address the first network communications and the second network communications to the hardware resources and the management controller.

9. The method of claim 1, wherein the data processing system further comprises a network module and hardware resources, the management controller and the single network module being are on separate power domains of an internal and primary power source of the data processing system from the hardware resources such that the management controller and the single network module are operable from receiving power from the internal and primary power source through a first power domain of the separate power domains while the hardware resources are inoperable from not receiving the power from the internal and primary power source through a second power domain of the separate power domains, the hardware resources comprising a processor of the data processing system, and the single network module, the hardware resources, and the management controller are all separate and distinct from one another within the data processing system.

10. The method of claim 9, wherein the location data is generated by the single network module while the hardware resources are inoperable due to being unpowered.

11. The method of claim 8, wherein the out-of-band communication channel runs through the single network module, and an in-band communication channel that services the hardware resources also runs through the network module.

12. The method of claim 8, wherein the management controller hosts a transmission control protocol/internet protocol (TCP/IP) stack to facilitate network communications via the out-of-band communication channel.

13. A non-transitory machine-readable medium having instructions stored therein, which when executed by a processor, cause the processor to perform operations for managing a data processing system based on location data, the operations comprising:
 providing, by a management controller that is physically installed within the data processing system and via an out-of-band communication channel, the location data to a geolocation management server tasked with mapping a location of the data processing system over time, wherein the data processing system comprises a single network module that is shared by the management controller and hardware resources of the data processing system, and the single network module is adapted to separately advertise network endpoints for the management controller and the hardware resources such that first network communications meant for the hardware resources never flow through the management controller and second network communications meant for the management controller never flow through the hardware resources;
 identifying, by the data processing system, an occurrence of an event that is based, at least in part, on the location data;
 performing, by the data processing system, an action set based on the occurrence of the event to update operation of the data processing system; and
 providing, by the data processing system, computer-implemented services based on the updated operation.

14. The non-transitory machine-readable medium of claim 13, wherein in an instance of the event where the event is reception of the action set from the geolocation management server:
 performing the action set comprises:
  limiting, by the management controller, use of at least one function of the data processing system.

15. The non-transitory machine-readable medium of claim 14, wherein limiting the use of the at least one function comprises:
 disabling, by the management controller, a portion of the hardware resources of the data processing system.

16. The non-transitory machine-readable medium of claim 15, wherein limiting the use of the at least one function further comprises:
 disabling, by the management controller, a piece of software hosted by the hardware resources of the data processing system.

17. A data processing system, comprising:
 a processor; and
 a memory coupled to the processor to store instructions, which when executed by the processor, cause the processor to perform operations for managing the data processing system based on location data, the operations comprising:
 providing, by a management controller that is physically installed within the data processing system and via an out-of-band communication channel, the location data to a geolocation management server tasked with mapping a location of the data processing system over time, wherein the data processing system comprises a single network module that is shared by both of the management controller and hardware resources of the data processing system, the single network module being adapted to separately advertise network endpoints for the management controller and the hardware resources such that first network communications meant for the hardware resources never flow through the management controller and second network communications meant for the management controller never flow through the hardware resources, and the processor is one of the hardware resources:
 identifying, by the data processing system, an occurrence of an event that is based, at least in part, on the location data;
 performing, by the data processing system, an action set based on the occurrence of the event to update operation of the data processing system; and
 providing, by the data processing system, computer-implemented services based on the updated operation.

18. The data processing system of claim 17, wherein in an instance of the event where the event is reception of the action set from the geolocation management server:
 performing the action set comprises:
  limiting, by the management controller, use of at least one function of the data processing system.

19. The data processing system of claim 18, wherein limiting the use of the at least one function comprises:
 disabling, by the management controller, a portion of the hardware resources of the data processing system.

20. The data processing system of claim 19, wherein limiting the use of the at least one function further comprises:
 disabling, by the management controller, a piece of software hosted by the hardware resources of the data processing system.

* * * * *